(12) United States Patent
Sarbin et al.

(10) Patent No.: US 10,721,136 B2
(45) Date of Patent: Jul. 21, 2020

(54) INTERFACE FOR NETWORK CONFIGURATION VIA GRAPHICAL REPRESENTATIONS OF NETWORK TOPOLOGY AND INTERNETWORKING SERVICES

(71) Applicant: Cisco Technology, Inc., San Jose, CA (US)

(72) Inventors: Brian Sarbin, Milpitas, CA (US); Christian Martin, Rumson, NJ (US); Daniel Garrison, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 340 days.

(21) Appl. No.: 15/212,045

(22) Filed: Jul. 15, 2016

(65) Prior Publication Data
US 2018/0018082 A1 Jan. 18, 2018

(51) Int. Cl.
*G06F 3/0484* (2013.01)
*H04L 12/24* (2006.01)
*G06F 3/0482* (2013.01)

(52) U.S. Cl.
CPC .......... *H04L 41/22* (2013.01); *H04L 41/0893* (2013.01); *H04L 41/12* (2013.01)

(58) Field of Classification Search
CPC ... G06F 3/0482; G06F 3/04847; H04L 41/22; H04L 41/0893; H04L 41/12
See application file for complete search history.

(56) References Cited

U.S. PATENT DOCUMENTS

| 9,258,195 B1* | 2/2016 | Pendleton | H04L 41/12 |
| 2003/0009540 A1* | 1/2003 | Benfield | H04L 41/0213 709/220 |

(Continued)

OTHER PUBLICATIONS

Moorey, Peter, LinkedIn, "Cisco APIC EM (SDN Controller) First Impressions | Peter Moorey | LinkedIn", dated Nov. 24, 2015, 20 pages.

(Continued)

*Primary Examiner* — Tan H Tran
(74) *Attorney, Agent, or Firm* — Merchant & Gould P.C.

(57) ABSTRACT

Computer systems and methods for improving a computer's ability to interface with a user to configure one or more internetworking services provided by a first group of computers for a second group of computers using a pictorial graph with nodes that represent logical network objects. In an embodiment, a computer system comprises: a display; a memory persistently storing a set of instructions and a set of data that defines a plurality of logical network objects; one or more processors coupled to the memory and the display, wherein the one or more processors execute the set of instructions, which causes the one or more processors to: retrieve, from the memory, the set of data that defines a plurality of logical network objects, wherein a first logical network object represents a particular internetworking service that is provided by one or more first computing devices among the plurality of computing devices in the computer network, and a second logical network object represents a corresponding grouping of one or more second computing devices of the plurality of computing devices in the computer network; cause to present, on the display, a plurality of nodes in a first pictorial graph, wherein each node in the plurality of nodes corresponds respectively to each object in the plurality of logical network objects.

18 Claims, 6 Drawing Sheets

(56) References Cited

U.S. PATENT DOCUMENTS

| | | | |
|---|---|---|---|
| 2008/0123559 A1* | 5/2008 | Haviv | G06F 8/61 |
| | | | 370/255 |
| 2015/0319039 A1* | 11/2015 | Generozova | G06F 9/44505 |
| | | | 709/220 |
| 2018/0069745 A1* | 3/2018 | Wang | H04W 24/04 |

OTHER PUBLICATIONS

Guthrie, Jeremy, "Cisco Live 2015: Overcoming Network Complexity with Cisco's APIC-EM Platform", http://blog.cdw.com/datacenter/ciscolive2015, dated Jun. 19, 2015, 3 pages. Apicem—a custom CSS subreddit theme, https://www.reddit.com/r/Apicem/, last viewed on Oct. 26, 2016, 3 pages.

* cited by examiner

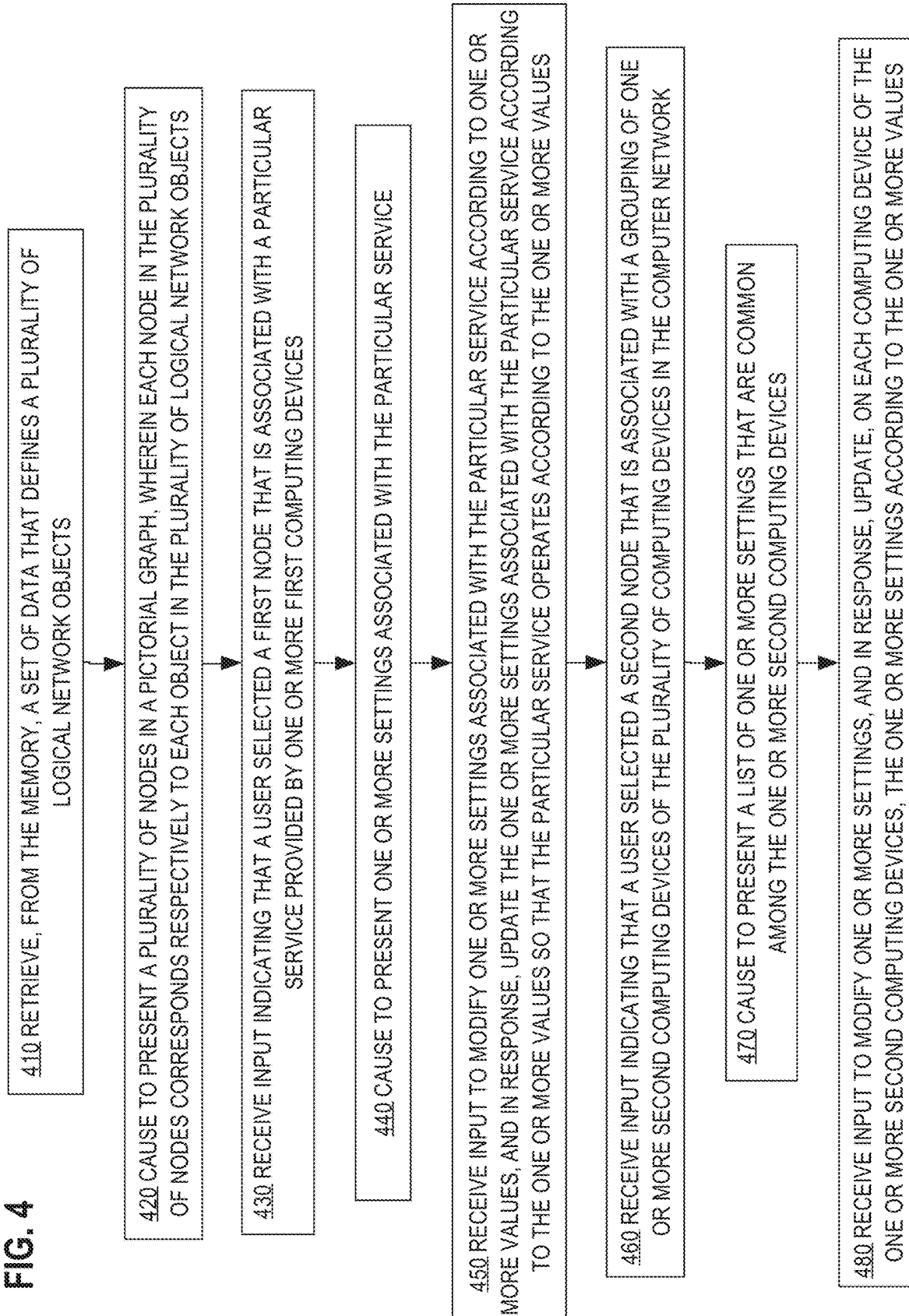

INTERFACE FOR NETWORK CONFIGURATION VIA GRAPHICAL REPRESENTATIONS OF NETWORK TOPOLOGY AND INTERNETWORKING SERVICES

TECHNICAL FIELD

The present invention generally relates to visualizing and configuring one or more internetworking services provided by a computer network rather than changing settings on one or more of the computers in the network individually to cause the one or more computers to provide the one or more internetworking services. More specifically, the present invention relates to improving a computer's ability to interface with a user to configure one or more internetworking services provided by a first group of computers for a second group of computers using a pictorial graph with nodes that represent logical network objects. SUGGESTED GROUP ART UNIT: 2447; SUGGESTED CLASSIFICATION: 709.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A computer network may comprise a plurality of computers, each of which may provide, or make use of, one or more internetworking services. For example, one or more computers in the computer network may provide a Virtual Private Network ("VPN") service. Among other things, a VPN service allows a computer that is outside of the computer network (an "outside computer") to connect to a computer inside the computer network as if the outside computer was in the computer network.

Implementing an internetworking service for a plurality of computers in a computer network may be complex and require various configurations to be set on one or more computers in a network. For example, a computer in the computer network may be configured as the VPN gateway, and one or more routers may be configured to provide static IP addresses, so that an outside computer can connect to a particular inside computer.

Managing one or more internetworking services for a plurality of computers in a computer network may also be difficult. Continuing with the previous example, a new network administrator may not have access to documentation that explains how each computer in the computer network was configured to provide or use the VPN service. The new network administrator may need to connect, or physically go, to each computer in the computer network to determine how the computer is configured to be used to provide or use the VPN service. To modify or reconfigure the VPN service, the new network administrator may have to connect, or physically go, to each computer in the computer network to modify the computer to provide or use the changed VPN service. Accordingly, tracking, determining, and modifying settings on one or more computers in a network individually to provide an internetworking service may be difficult.

SUMMARY

The appended claims may serve as a summary of the invention.

BRIEF DESCRIPTION OF THE DRAWINGS

In the drawings:

FIG. 4 illustrates a process for generating a user interface for improving a computer's ability to visualize and receive input from a user to configure the functionality provided by a computer network as a whole, according to an example embodiment.

Figure 1:
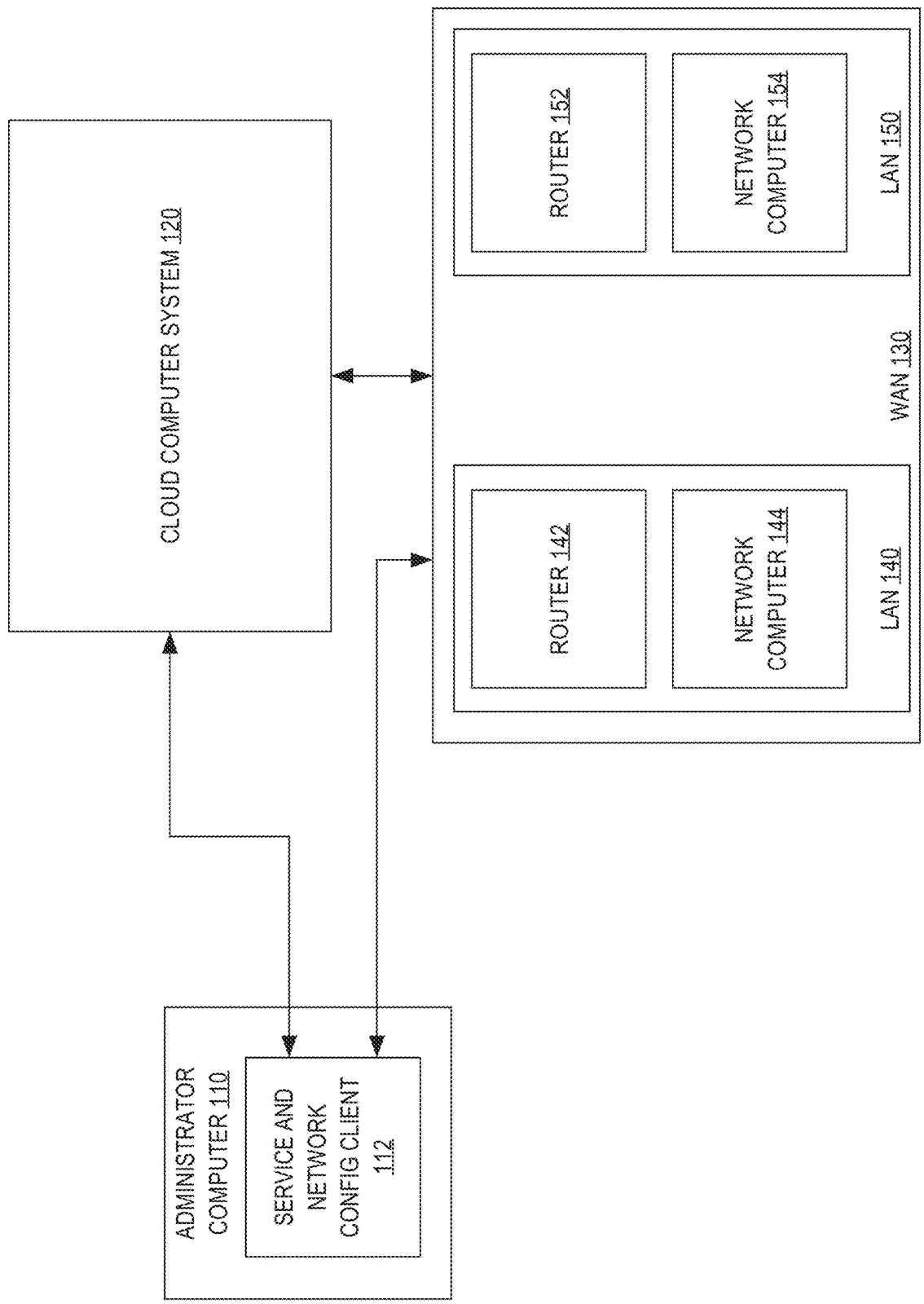
FIG. 1 illustrates a block diagram of a network for visualizing and configuring the network's services and functionality in an example embodiment.
Figure 2:
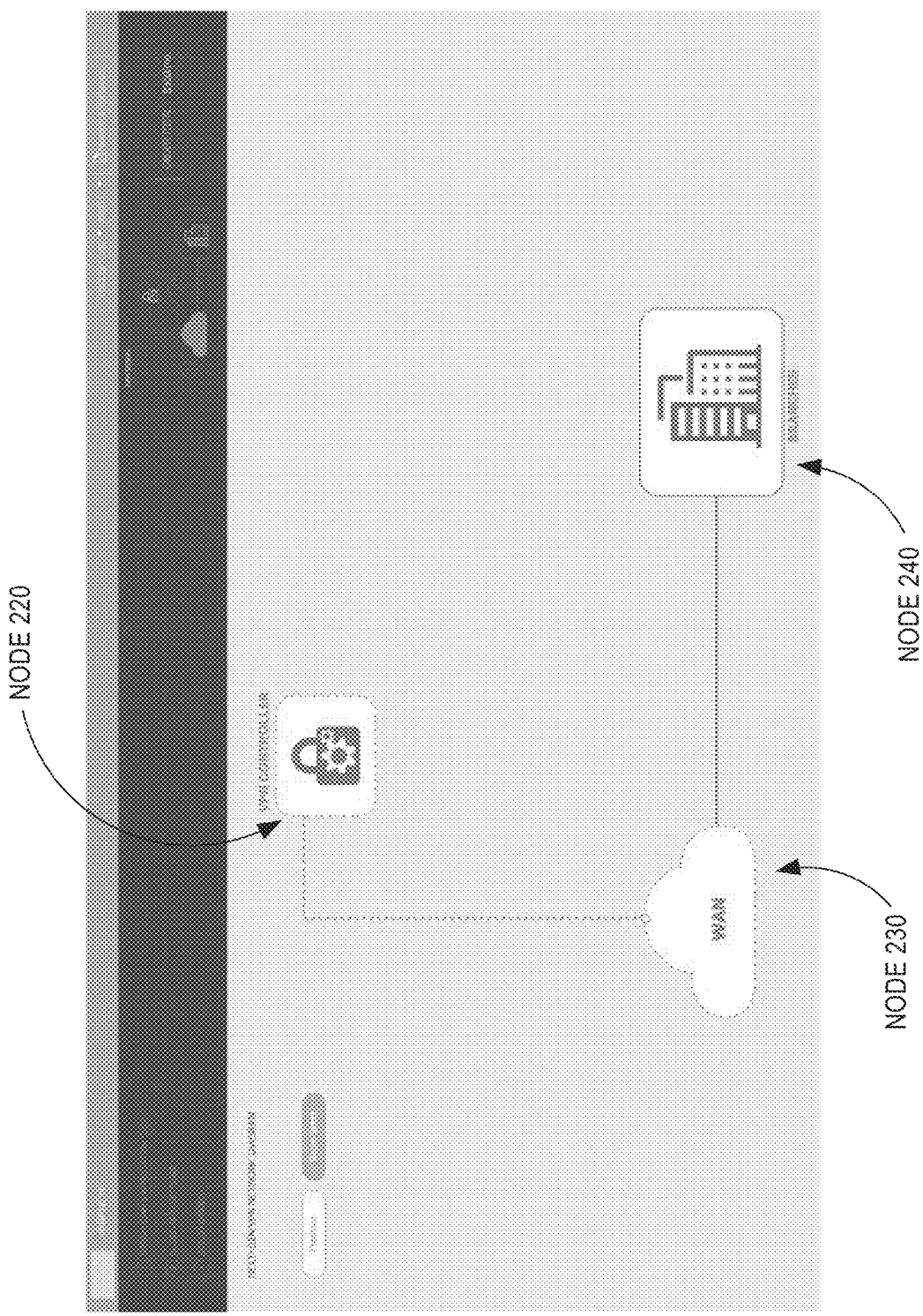
FIG. 2 illustrates an example user interface for improving a computer's ability to visualize and receive input from a user to configure an internetworking service provided by a computer network with a plurality of computing devices according to an example embodiment.

While each of the drawing figures illustrates a particular embodiment for purposes of illustrating a clear example, other embodiments may omit, add to, reorder, or modify any of the elements shown in the drawing figures. For purposes of illustrating clear examples, one or more figures may be described with reference to one or more other figures, but using the particular arrangement illustrated in the one or more other figures is not required in other embodiments. For example, admin computer 110, cloud computer system 120, and WAN 130 in FIG. 1, as well as node 220, node 230, and node 240 in FIG. 2, may be described with reference to several steps in FIG. 4 and discussed in detail below, but using the particular arrangements illustrated in FIG. 1 or FIG. 2 are not required in other embodiments.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Furthermore, words, such as "or" may be inclusive or exclusive unless expressly stated otherwise.

Embodiments are described herein according to the following outline:

1.0 General Overview
2.0 Example Network Topology
3.0 Example Interfaces for Improving a Computer's Ability to Visualize and Configure Functionality Provided by one or more Computers in a Computer Network
4.0 Example Process for Generating an Interface for Improving a Computer's Ability to Visualize and Configure the Functionality Provided by one or more Computers in a Computer Network
5.0 Example Process for Implementing a New Internetworking Service for one or more Computers
6.0 Implementation Mechanisms—Hardware Overview 7.0 Other Aspects of Disclosure
1.0 General Overview The present invention generally relates to visualizing and configuring one or more internetworking services provided by a computer network rather than changing settings on one or more computers in the network individually to cause the one or more computers to provide the one or more internetworking services. In an embodiment, a computer system comprises: a display; a memory persistently storing a set of instructions and a set of data that defines a plurality of logical network objects; one or more processors coupled to the memory and the display, wherein the one or more processors execute the set of instructions, which causes the one or more processors to: retrieve, from the memory, the set of data that defines a plurality of logical network objects, wherein a first logical network object represents a particular internetworking service that is provided by one or more first computing devices among the plurality of computing devices in the computer network, and a second logical network object represents a corresponding grouping of one or more second computing devices of the plurality of computing devices in the computer network; cause to present, on the display, a plurality of nodes in a first pictorial graph, wherein each node in the plurality of nodes corresponds respectively to each object in the plurality of logical network objects.

In an embodiment, the set of instructions cause the one or more processors to: receive input indicating that a user selected a first node, among the plurality of nodes, which corresponds to the first logical network object; in response to receiving the input indicating that the user selected the first node, cause to present, on the display, one or more settings associated with the particular service.

In an embodiment, the set of instructions cause the one or more processors to: receive input to modify one or more settings associated with the particular service according to one or more values; in response to receiving the input to modify the one or more settings associated with the particular service according to the one or more values, update the one or more settings associated with the particular service according to the one or more values so that the particular service operates according to the one or more values.

In an embodiment, the set of instructions cause the one or more processors to: receive input indicating that a new service should be provided by one or more third computing devices among the plurality of computing devices in the computer network for the one or more second computing devices; cause to present, on the display, a new node in the graph that corresponds to a new logical network object of the plurality of logical network objects that represents the new service; cause to present, on the display, an edge between the new node and the second node indicating that the new service is for the one or more second computing devices; cause to present, on the display, a first indication that a first step of instantiating the new service is modifying one or more first settings that are common among the one or more second computing devices; cause to present, on the display, a second indication that a second step of instantiating the new service is modifying one or more second settings that are associated with the new service so that the new service operates according to the one or more second settings.

In an embodiment, a method for visualizing and configuring functionality provided by a computer network with a plurality of computing devices comprises: retrieving, from the memory, the set of data that defines a plurality of logical network objects, wherein a first logical network object represents a particular internetworking service that is provided by one or more first computing devices among the plurality of computing devices in the computer network, and a second logical network object represents a corresponding grouping of one or more second computing devices of the plurality of computing devices in the computer network; causing to present, on a display, a plurality of nodes in a first pictorial graph, wherein each node in the plurality of nodes corresponds respectively to each object in the plurality of logical network objects.

A "computer" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, routers, hubs, switches, desktop computers, laptop computers, mobile devices, or any other special-purpose computing devices. Any reference to "a computer" herein may mean one or more computers, unless expressly stated otherwise. Further, for purposes of illustrating a clear example, a limited number of elements are shown in FIG. 1 but other embodiments may use any number of network devices or computers.

A "set" may comprise one or more items. For example, a set of computers may be one or more computer.

Causing to present a graphical element, such as a node, edge, graph, or other user interface element, may comprise updating one or more frame buffers in one or more processors, and instruct the one or more processors to present the graphical element on a display.

2.0 Example Network Topology

The systems and processes discussed herein improves the ability of the computer to provide an interface for a user to manage one or more internetworking services or functionality rather than configuring individual network devices or computers or devices in the network. FIG. 1 illustrates a block diagram of a network for visualizing and configuring the network's services and functionally in an example embodiment. In FIG. 1, system 100 comprises administrator computer ("admin computer") 110, network services configuration client ("configuration client") 112, cloud computer system 120, and Wide Area Network ("WAN") 130.

WAN 130 comprises a plurality of computer networks, two of which are illustrated as Local Area Network ("LAN") 140 and LAN 150. Each computer network comprises a plurality of computers and network devices. For example, LAN 140 comprises router 142 and network computer 144; computers in LAN 140, such as network computer 144, are coupled to one or more network computers, such as admin computer 110, WAN 130, and cloud computer system 120, through router 142. LAN 150 comprises router 152 and network computer 154; computers in LAN 150, such as network computer 154, are coupled to one or more network computers, such as admin computer 110, WAN 130, and cloud computer system 120, through router 152.

Cloud computer system 120 comprises one or more computer networks comprising one or more computing devices. Cloud computer system 120 may provide one or more services to one or more computer networks, such as WAN 130.

Admin computer 110 is a computer that is communicatively coupled to cloud computer system 120 and WAN 130, and one or more devices within cloud computer system 120 and WAN 130. Admin computer 110 comprises service and network configuration client ("configuration client") 112, which is software executed on admin computer 110 that can monitor or configure the state of one or more computers, such as router 142, network computer 144, router 152, and network computer 154. Configuration client 112 may cause one or more user interfaces to be presented on a display coupled to admin computer 110 based on the computers that configuration client 112 is coupled to, and based on the services or functionality that the computers provide collectively. Processes for generating the one or more user interfaces, and enabling a user to configure services or functionality of a network, is discussed in detail further herein.

3.0 Example Interfaces for Improving a Computer's Ability to Visualize and Configure Functionality Provided by One or More Computers in a Computer Network FIG. 2 illustrates an example user interface for improving a computer's ability to visualize and receive input from a user to configure an internetworking service provided by a computer network with a plurality of computing devices according to an example embodiment. In FIG. 2, node 220 corresponds to a first logical network object that represents an internetworking service provided by a first grouping of one or more first computers. In this particular example, the first logical network object is a VPN service provided by one or more cloud-based server computers. Node 230 corresponds to a second logical network object that represents a second grouping of one or more computers that receive the internetworking service. One or more computers in the first grouping of computers may also be included in the second grouping of computers. Node 240 corresponds to a third logical network object that represents the computers in the second grouping of computers. The computers associated within node 240 may be grouped by a physical attribute, such as a physical location or branch in which each computer is located.

For purposes of illustrating clear examples herein, but without limiting the scope of the disclosure to the examples, assume the following:

Node 220 corresponds to a service that cloud computer system 120 provides to WAN 130;

Node 230 corresponds to, or represents, one or more functions or features of WAN 130 to support the internetworking service, which in this example, is the VPN service;

Node 240 also corresponds to WAN 130, however node 240 represents the structural or physical as aspects of the computers in WAN 130, such as which LANs or computers are in which geographic or topological location.

Accordingly, changing a parameter associated with node 230 may cause configuration client 112 to change the functioning of one or more devices in WAN 130 to produce a desired functionality. Changing a parameter of associated with node 240 may cause configuration client 112 to propagate a particular setting associated with a particular device to the particular device in WAN 130. In an embodiment, changing one or more parameters associated with a node causes the configuration client 112 to generate instructions, in the form of command-line interface (CLI) commands, configuration file updates, simple network management protocol (SNMP) GET or SET requests with respect to specified management information base (MIB) objects or MIB attributes, or other events or messages, that are communicated to the underlying physical devices that the affected nodes represent. In this manner, changing a parameter associated with a node can result in performing an immediate change to the running configuration of the routers, switches, or other physical internetworking gear or computers that the nodes represent.

Figure 3A:
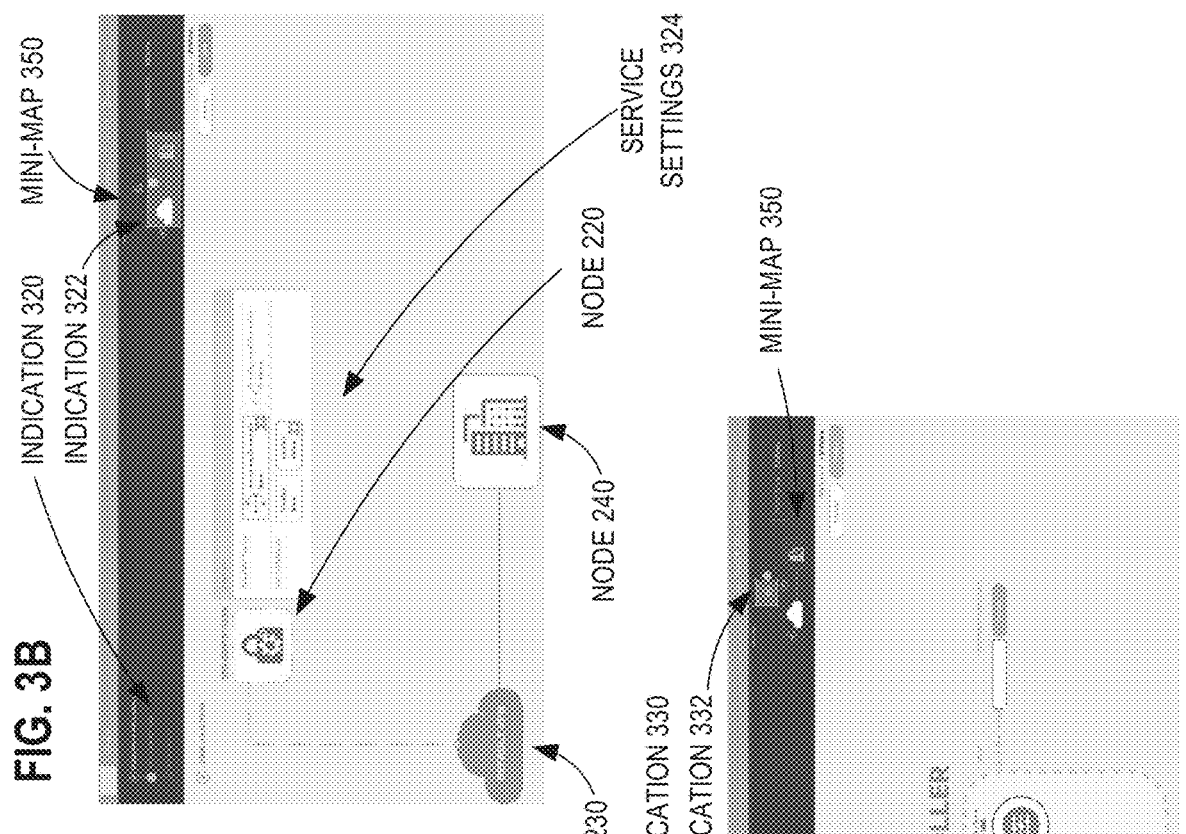
FIG. 3A, FIG. 3B, and FIG. 3C each illustrate an example user interface at different steps of instantiating or configuring an internetworking service in an example embodiment.
Figure 3B:
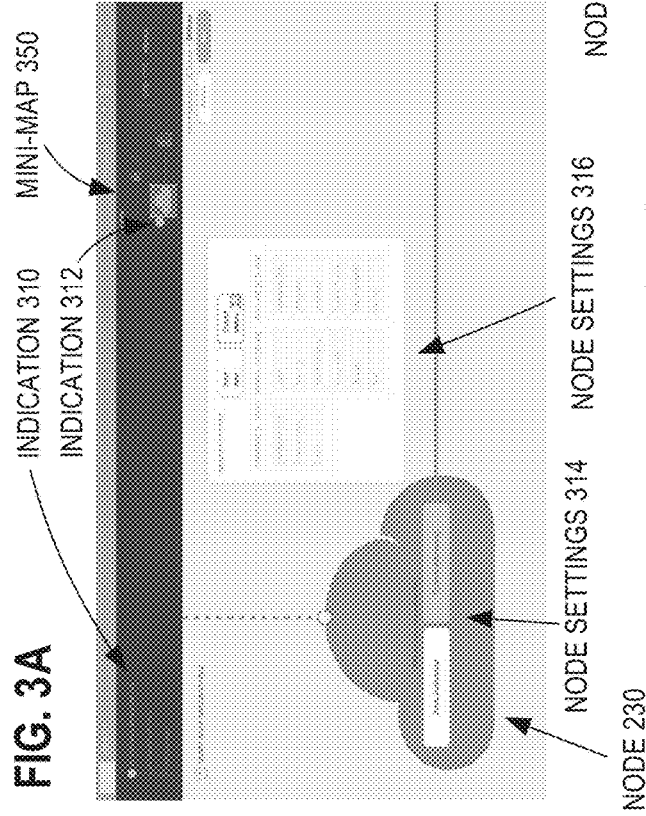
Figure 3C:
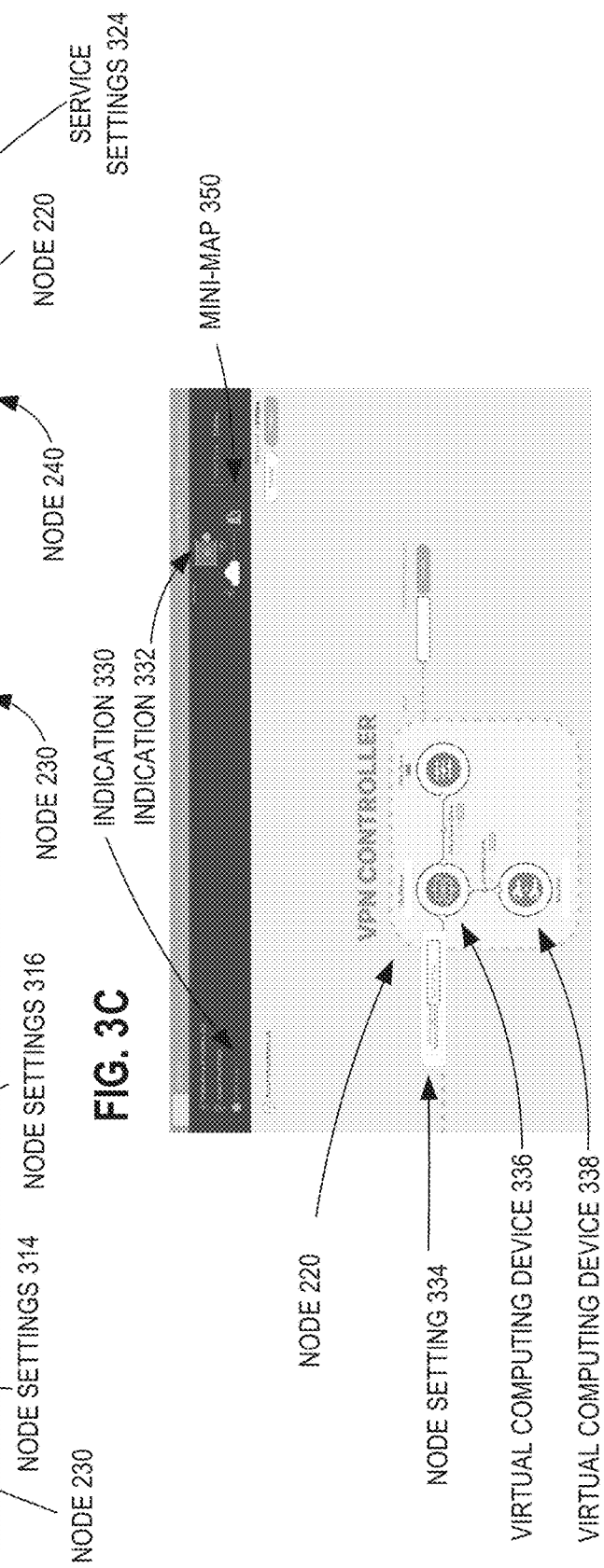

FIG. 3A, FIG. 3B, and FIG. 3C each illustrate an example user interface at different steps of instantiating or configuring an internetworking service in an example embodiment. As discussed further herein, the user interfaces in FIG. 3A, FIG. 3B, and FIG. 3C may be used to set or modify one or more settings for an internetworking service, one or more settings that are common between computers in a group of computers that are represented by the same node, or one or more settings associated with one or more virtual computers.

4.0 Example Process for Generating an Interface for Improving a Computer's Ability to Visualize and Configure the Functionality Provided by One or More Computers in a Computer Network FIG. 4 illustrates a process for generating a user interface for improving a computer's ability to visualize and receive input from a user to configure the functionality provided by a computer network as a whole, according to an example embodiment. In step 410, a computer retrieves, from memory coupled to the computer, a set of data that defines a plurality of logical network objects. For purposes of illustrating a clear example, assume the following:

Admin computer 110 comprises one or more processors that are coupled to a volatile or non-volatile memory;

The memory comprises configuration client 112;

The memory has a set of data stored that identifies a first logical network object, a second logical network object, and a third logical network object;

The first logical network object corresponds to a VPN service provided by cloud computer system 120;

The second logical network object corresponds to WAN 130;

The third logical network object is a representation of WAN 130, wherein each computer in WAN 130 is organized by a physical attribute of the computer (in this example, the physical attribute is the "branch" or LAN that each computer in WAN 130 is located within).

Other embodiments may use arrangements other than with these assumptions. With these assumptions, admin computer 110 executes configuration client 112 and retrieves the set of data that identifies the first logical network object, the second logical network objects, and the third logical network objects. The set of data may be defined by one or more users or computers. For example, configuration client 112 may receive data, from a network administrator of WAN 130, identifying one or more of the computers in WAN 130, the network topology of the one or more computers in WAN 130, and information to connect and update settings in the one or more computers in WAN 130. The network administrator for WAN 130 may also request, from cloud computer system 120 through configuration client 112, the VPN service for the WAN 130. In response, configuration client 112 may receive data from cloud computer system 120 that cloud computer system 120 will provide the VPN service. The data may also identify one or more options for the VPN service.

In step 420, the computer causes to present a plurality of nodes in a pictorial graph, wherein each node in the plurality of nodes corresponds respectively to each object in the plurality of logical network objects. For purposes of illustrating a clear example, assume that the one or more processors in admin computer 110 are coupled to a display. Accordingly, configuration client 112 causes the pictorial graph illustrated in FIG. 2 to be presented on the display. Node 220 corresponds with the first logical network object (the VPN service provided by cloud computer system 120), node 230 corresponds the second logical network object (WAN 130), and node 240 corresponds to the third logical network object (the computers in WAN 130 organized according to which LAN each computer is located within).

FIG. 2, FIG. 3A, FIG. 3B, and FIG. 3C, include edges that are illustrated between nodes. The edges, and how the edges are illustrated, are discussed in detail further herein.

In step 430, the computer receives input indicating that a user selected a first node that is associated with a particular service provided by one or more first computing devices. For example, configuration client 112 may receive input indicating that a user selected node 220.

In step 440, the computer causes to present one or more settings associated with the particular service. Continuing with the previous example, and in response to receiving input indicating that a user selected node 220 in FIG. 2, configuration client 112 may cause FIG. 3B to be presented on the display. In FIG. 3B, service settings 324, which corresponds to the VPN service associated with node 220, is presented on the display. Among other things, service settings 324 allow a user using configuration client 112 to select what VPN topology that the user would like to use for users to connect to computers in WAN 130 from one or more computers outside of WAN 130, or whether a user would like to enable or disable the VPN service.

In step 450, the computer receives input to modify one or more settings associated with the particular service according to one or more values, and in response, updates the one or more settings associated with the particular service according to the one or more values so that the particular service operates according to the one or more values. Continuing with the previous example, in response to receiving input that a user selected Policy-based Connectivity, configuration client 112 may request one or more additional values from the user if needed, and update one or more computers, gateways, or policies, in cloud computer system 120 or WAN 130 so that the VPN service uses Policy-based Connectivity. Configuration client 112 may make one or more SNMP SET requests to each of the one or more other computers in cloud computer system 120 or WAN 130 to cause each of the one more computers to update one or more settings according to the input or values given by the user so that cloud computer system 120 provides the VPN service using Policy-based Connectivity.

Configuration client 112 may update the data in the memory indicating the modification to the service, which in this example is that the VPN service is using Policy-based Connectivity. Accordingly, at subsequent time, a user may request, from configuration client 112, to see what connectivity settings are being used for the VPN service. In response, configuration client 112 may determine from the set of data in memory that the VPN service is using Policy-based Connectivity. Accordingly, configuration client 112 may present the interface in FIG. 3B; however, the box for Policy-based Connectivity may be highlighted instead of the box for Any-to-any Connectivity.

In step 460, the computer receives input indicating that a user selected a second node that is associated with a grouping of one or more second computing devices of the plurality of computing devices in the computer network. For example, configuration client 112 may receive input indicating that a user selected node 230.

In step 470, the computer causes to present a list of one or more functions or settings that are common among the one or more second computing devices. For example, in response to selecting node 230, configuration client 112 may present the interface in FIG. 3A, which shows options for functions or settings implemented or common between one or more computers in WAN 130 that support the VPN service. In FIG. 3A, node settings 314 includes buttons for selecting what type of addressing to use within WAN 130: static addressing or dynamic addressing. Addressing computers within a network is a function that is common between router 142 and router 152 in this example. The particular settings for the function, static addressing or dynamic addressing, are common settings for the common function between router 142 and router 152 in this example. These options may also be associated with a service that is provided to, or by, the computers.

In step 480, the computer receives input to modify one or more settings, and in response, updates, on each computing device of the one or more second computing devices, the one or more settings according to the one or more values. Continuing with the previous example, in response to input indicating that a user selected one or more particular settings or values, such as static addressing, configuration client 112 may interface with computers responsible for this function, which in this example are router 142 and router 152, and update one or more settings on each device so that router 142 uses static addressing for each computer in LAN 140 and router 152 uses static addressing for each computer in LAN 150. Configuration client 112 may further assign a first subnet to router 142 and a second, different subnet to router 152. Accordingly, each computer in WAN 130 will have a static, different address. Specifically, configuration client 112 may make one or more SNMP SET requests to router 142 indicating that router 142 should statically assign IP addresses to computers within LAN 140, and the IP addresses should be addresses within a first particular CIDR block. Configuration client 112 may make one or more SNMP SET requests to router 152 indicating that router 152 should statically assign IP addresses to computers within LAN 150, and the IP addresses should be addresses within a second particular CIDR block that is different from the first CIDR block. The first CIDR block and the second CIDR block may be given as input by a user.

Other functions or settings to one or more computers within WAN 130 may be common and configurable, but not related to how cloud computer system 120 provides the VPN service to WAN 130. One or more of those settings to those one or more functions may be presented in a different region of an interface that visually indicates the one or more settings or functions are common to one or more computers in WAN 130. For example, node settings 316 may show a list of one or more settings or features that one or more computers, such as router 142 and router 152, in WAN 130 may provide. Those settings or functions may, but need not, be functions or settings that are associated with the VPN service. Configuration client 112 may receive input from a user for one or more of those settings, and in response, configuration client 112 may interface with each of the one or more computers in WAN 130 that provide those functions, such as router 142 and router 152, and modify the one or more settings according to the input.

Additionally or alternatively, selecting a node may give a more detailed view of the one or more computers that the node represents. For example, in response to receiving input indicating that a user selected node 220, configuration client 112 may present an interface that indicates one or more computers that are used to provide the service, as illustrated in FIG. 3C. Accordingly, in FIG. 3C, a subgraph is illustrated within node 220. The subgraph shows a gateway computer, a key server computer, and a proxy server computer. The interface may zoom into a node such as node 220 to provide enough room to display the computers clearly as shown in FIG. 3C. One or more of the computers may be virtual computers. For example, virtual computing device 336 and virtual computing device 338 represent two virtual computers that are used to provide the VPN service: a gateway computer and a key server computer.

Configuration client 112 may also provide an interface for modifying one or more settings associated with a computer in a node associated with an internetworking service. For example, in FIG. 3C, node setting 334 provides an input field for a user to set the IP address associated with WAN 130 for the virtual gateway computer. The input field may be presented by configuration client 112 in response to receiving input that a user selected the gateway computer. In response to receiving input from a user, which in this example may be a Classless Inter-Domain Routing ("CIDR") block, configuration client 112 may send the IP address or CIDR block to the virtual computer or computer hosting the virtual computer through one or more protocols such as Transmission Control Protocol/Internet Protocol ("TCP/IP").

5.0 Example Process for Implementing a New Internetworking Service for One or More Computers Cloud computer system 120 may offer one or more other internetworking services, such as a Domain Name Service ("DNS"). The one or more computers in cloud computer system 120 that provide the DNS may, but need not, provide the VPN service. Additionally or alternatively, one or more computers in cloud computer system 120 may provide the same one or more services for different sets of computers in WAN 130. For example, cloud computer may provide a VPN service for LAN 140, and another, separately configurable VPN service for LAN 150. Additionally or alternatively, one more computers in WAN 130 may provide a service to one or more computers in WAN 130. Additionally or alternatively, configuration client 112 may receive input indicating that a user would like to change an internetworking service provided by one or more computers in cloud computer system 120 or WAN 130 to one or more computers in WAN 130. In response, configuration client 112 may guide a user through a pictorial graph to setup, or update, the internetworking service.

Figure 5:
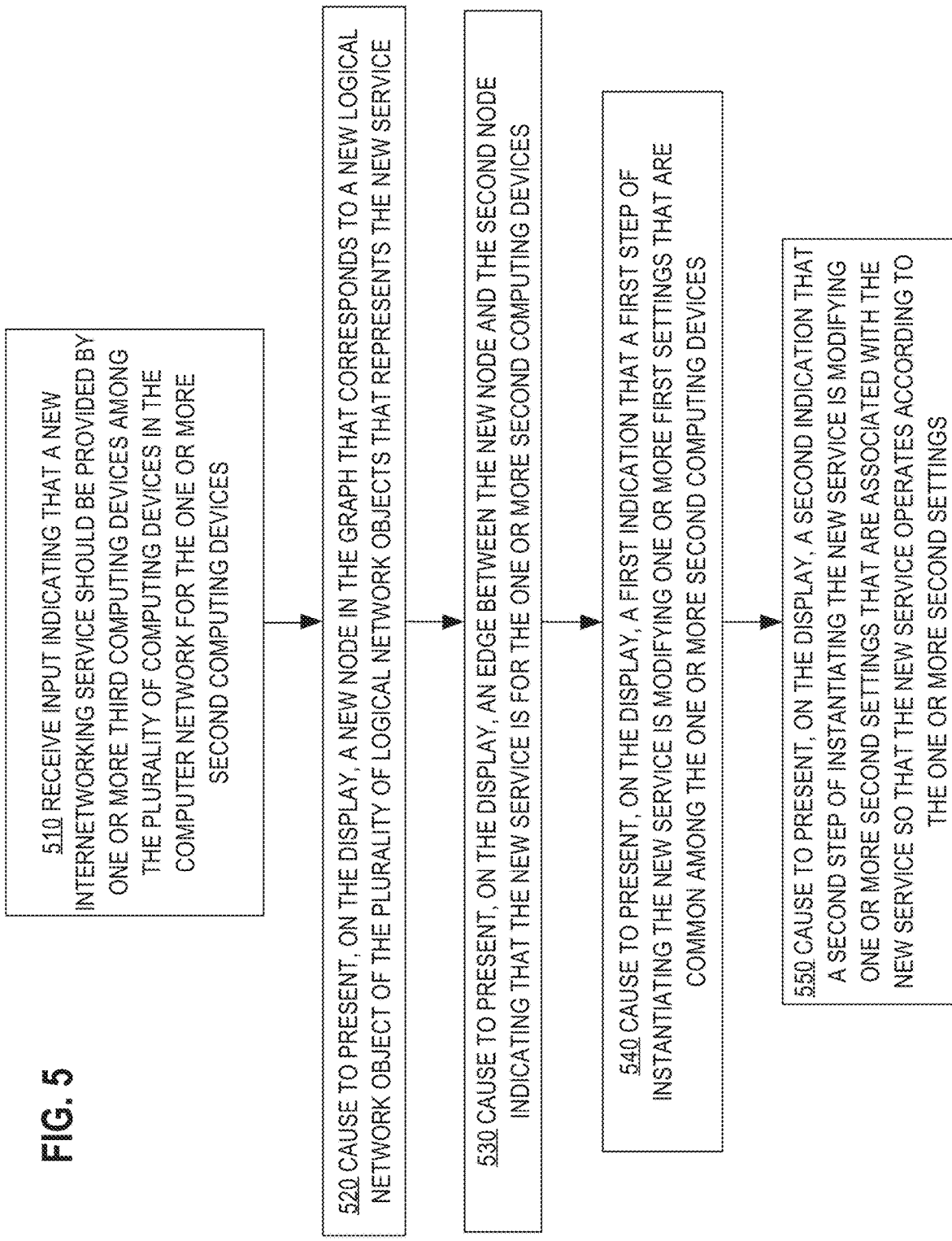
FIG. 5 illustrates a process for presenting a series of interfaces to setup or update one or more internetworking services for one or more computers across one or more computer networks in an example embodiment.

FIG. 5 illustrates a process for presenting a series of interfaces to initialize or update one or more internetworking services for one or more computers across one or more computer networks in an example embodiment. In step 510, a computer receives input indicating that a new internetworking service should be provided by one or more third computing devices among the plurality of computing devices in the computer network for the one or more second computing devices. For purposes of illustrating a clear example, assume that the VPN service, provided by cloud computer system 120 for WAN 130 and discussed above in FIG. 4, has not been initialized yet. Accordingly, configuration client 112 may present an interface like the interface illustrated in FIG. 2 comprising node 230 and node 240, but not node 220. Furthermore, configuration client 112 may receive input that a user selected a button indicating that the user would like to initialize a VPN service provided by cloud computer system 120 for WAN 130.

In step 520, the computer causes to present, on the display, a new node in the graph that corresponds to a new logical network object of the plurality of logical network objects that represents the new service. Accordingly, configuration client 112 may cause node 220 to be presented in the interface illustrated in FIG. 2. Configuration client 112 may send one or more network requests, such as HyperText Transfer Protocol ("HTTP") requests, to a particular server computer in cloud computer system 120 requesting a VPN service for WAN 130. In response, configuration client 112 may receive and store data from the particular server computer in cloud computer system 120 identifying the Internet Protocol ("IP") address of each computer or virtual computer that may provide the VPN service, and information for sending SNMP or other protocol instructions to configure each computer or virtual computer.

In step 530, the computer causes to present, on the display, an edge between the new node and the second node indicating that the new service is for the one or more second computing devices. Continuing with the previous example, configuration client 112 may cause the dotted edge between node 220 and node 230 to be presented on the display.

The dotted edge may be a first type of edge that indicates that node 220 is a logical network object that represents an internetworking service provided, by one or more computers that are working in concert, to another logical network object that may comprise one or more computers. Furthermore, configuration client 112 may cause the solid edge between node 230 and node 240 to be presented on the display. The solid edge may be a second type of edge that indicates that node 230 is a logical network object that comprises one or more physical computers that make up the one or more computers represented by node 230.

Nodes that are associated with logical network objects that represent a service or a logical grouping of one or more computers may be represented differently than nodes that are associated with logical network objects that represent one or more physical computers. For example, node 220 and node 230 are each outlined with a dotted line, but node 240 is outlined with a solid line. Node 220 is outlined with a first style, which in this example is a dotted line, because node 220 represents a VPN service. Node 230 is also outlined with the first style because node 230 represents a grouping of one or more computers based on a logical attribute, which in this example are the computers and LANs that are designated to be in WAN 130, which are receiving, or are being configured to receive, the VPN service. Node 240 is outlined in a second style, which in this example is a solid line, because node 240 represents a grouping of one or more actual computers based on a physical attribute, which in this example is the particular branch or LAN that each computer is physically coupled to, in WAN 130. In the example illustrated in FIG. 2, there are three nodes and two edges. Other embodiments may include any number of nodes, or edges between nodes; each of the nodes or edges may be represented differently or the same as one or more other nodes, or edges between nodes.

In an embodiment, in response to receiving input indicating that a user selected node 240, configuration client 112 may present a subgraph with a set of one or more nodes that corresponds to computers that are grouped based on the physical attribute(s). Accordingly, in this example, configuration client 112 may present two boxes which with a label that identifies the corresponding LAN or branch. Each box may include data that identifies which computers are located within the corresponding LAN.

In step 540, the computer causes to present, on the display, a first indication that a first step of instantiating the new service is modifying one or more first settings that are common among the one or more second computing devices. For example, configuration client 112 may present the interface illustrated in FIG. 3A, which comprises indication 310. Indication 310 may indicate that configuration client 112 is presenting options, features, functions, settings, or services associated with node 230 that are part of a first phase to instantiate the VPN service. FIG. 3A also comprises mini-map 350, which illustrates a smaller rendition of the pictorial graph presented in step 520 and 530. A mini-map may give a user a coherent summary and shortcut to navigate the graph. FIG. 3A also comprises indication 312, which may also indicate that configuration client 112 is presenting options, features, functions, settings, or services associated with node 230 that are part of the first phase to instantiating the VPN service. Indication 312 may also highlight one or more node(s) that correspond to one or more logical networking objects in the mini-map that are responsible for providing, or affected by, the options, features, functions, settings, or services associated with node 230 that are part of the first phase to instantiating the VPN service. In response to receiving input that a user selected the "Next" button in the interface illustrated in FIG. 3A, configuration client 112 may proceed to step 550. In response to receiving input from the user specifying one or more values for one more settings, configuration client 112 may make one or more SNMP SET requests to one or more computers changing the running configuration of the one or more computers so that the one or more computers perform the service according to the input received from the user.

In step 550, the computer causes to present, on the display, a second indication that a second step of instantiating the new service is modifying one or more second settings that are associated with the new service so that the new service operates according to the one or more second settings. For example, configuration client 112 may present the interface illustrated in FIG. 3B. FIG. 3B comprises indication 320 and indication 322. Indication 320 may indicate that configuration client 112 is presenting options, features, functions, settings, or services associated with node 230 and node 240, and are part of a second phase to instantiating the VPN service. The interface also comprises mini-map 350, which may indicate that configuration client 112 is presenting options, features, functions, settings, or services associated with node 230 and node 240 that are part of a second phase to instantiating the VPN service. Indication 322 may also highlight one or more node(s) that correspond to one or more logical networking objects in the mini-map that are responsible for providing, or affected by, the options, features, functions, settings, or services associated with the second phase of instantiating the VPN service. In this example, those nodes are node 230 and node 240. In response receiving input from the user specifying one or more values for one or more settings, configuration client 112 may make one or more SNMP SET requests to one or more computers changing the running configuration of the one or more computers so that the one or more computers perform the service according to the input received from the user.

Step 540 or step 550 may be repeated until all the phases of instantiating or configuring the service have finished. For example, in response to receiving input that a user selected the "Next" button in the interface illustrated in FIG. 3B, configuration client 112 may proceed to the next step in instantiating the VPN service. Accordingly, configuration client 112 may present the interface illustrated in FIG. 3C. FIG. 3C comprises indication 330, which indicates that configuration client 112 is presenting options, features, functions, settings, or services associated with node 220 that are part of a third phase to instantiating the VPN service. The interface also comprises mini-map 350, which may indicate that configuration client 112 is presenting options, features, functions, settings, or services associated with node 230 that are part of the third phase to instantiating the VPN service.

Indication 332 may also highlight one or more nodes that correspond to one or more logical networking objects in the mini-map that are responsible for providing, or affected by, the options, features, functions, settings, or services associated with the third phase of instantiating the VPN service. In this example, that node is node 220.

6.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
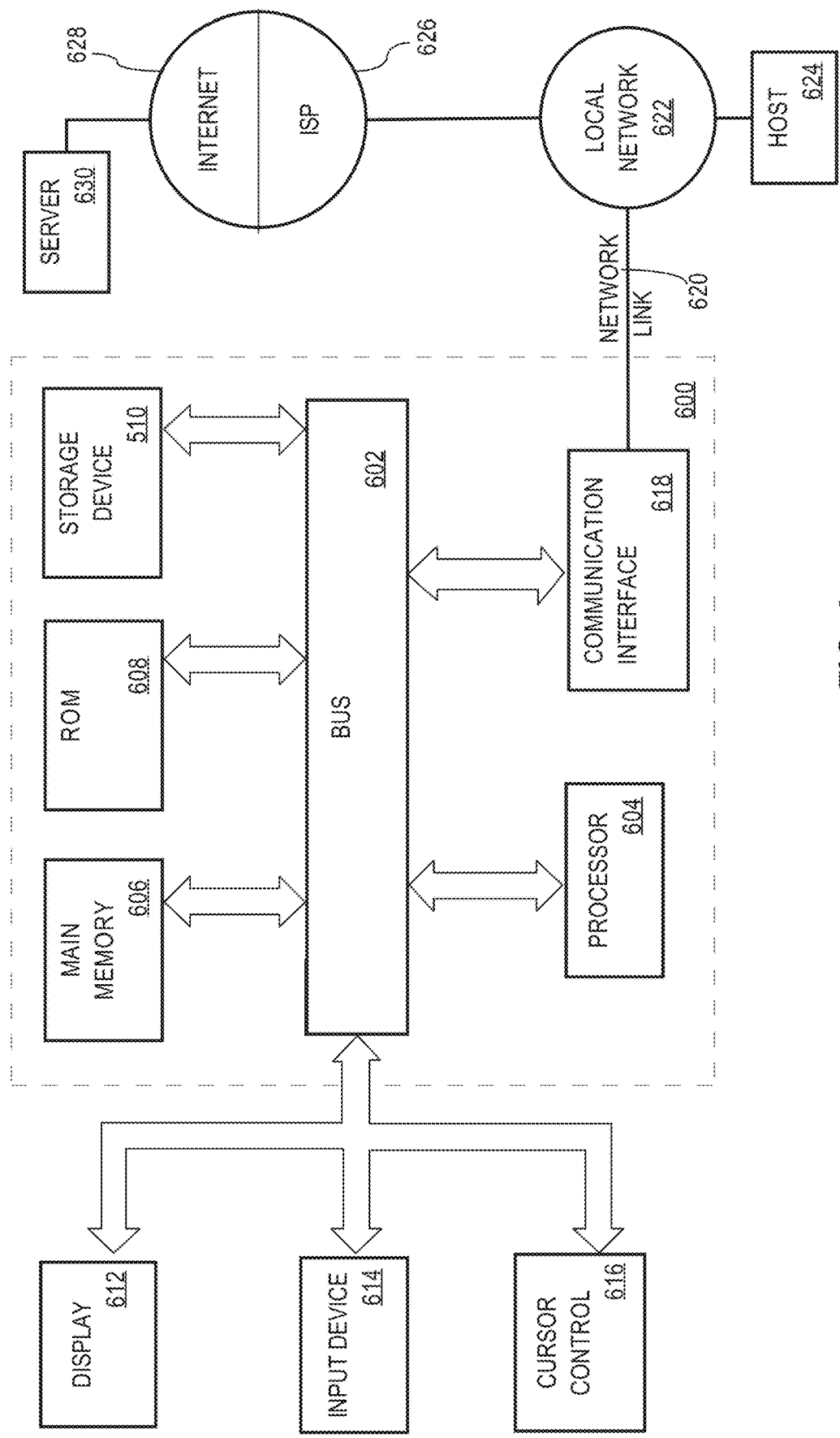
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main-memory 606, such as a random access memory (RAM) or other dynamic storage device, coupled to bus 602 for storing information and instructions to be executed by processor 604. Main-memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main-memory 606. Such instructions may be read into main-memory 606 from another storage medium, such as storage device 610. Execution of the sequences of instructions contained in main-memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main-memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main-memory 606, from which processor 604 retrieves and executes the instructions. The instructions received by main-memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server computer 630 might transmit a requested code for an application program through Internet 628, ISP 626, local network 622 and communication interface 618.

The received code may be executed by processor 604 as it is received, and/or stored in storage device 610, or other non-volatile storage for later execution.

7.0 Other Aspects of Disclosure

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer system comprising:
a display;
a memory persistently storing a set of instructions and a set of data that defines a plurality of logical network objects;
one or more processors coupled to the memory and the display, wherein the one or more processors execute the set of instructions, which causes the one or more processors to:
retrieve, from the memory, the set of data that defines the plurality of logical network objects, wherein a first logical network object represents a particular internetworking service that is provided by one or more first computing devices among a plurality of computing devices in a computer network, and wherein a second logical network object represents a corresponding grouping of one or more second computing devices of the plurality of computing devices in the computer network;
cause to present, on the display, a plurality of nodes in a first pictorial graph, wherein each node in the plurality of nodes corresponds respectively to each object in the plurality of logical network objects;
receive input indicating that a new service should be provided by one or more third computing devices among the plurality of computing devices in the computer network for the one or more second computing devices;
cause to concurrently present, on the display, the first pictorial graph and a first indication that a first step of instantiating the new service is modifying one or more first settings that are common among the one or more second computing devices; and cause to concurrently present, on the display, the first pictorial graph and a second indication that a second step of instantiating the new service is modifying one or more second settings that are associated with the new service so that the new service operates according to the one or more second settings, wherein causing the one or more processors to concurrently present the first pictorial graph and the second indication further comprises causing the one or more processors to:

cause to present, on the display, a new node in the graph that corresponds to a new logical network object of the plurality of logical network objects that represents the new service, cause to present, on the display, an edge between the new node and a second node indicating that the new service is for the one or more second computing devices, cause to present a mini-map illustrating a rendition of the first pictorial graph, the mini-map providing shortcuts to navigate the first pictorial graph, and cause to provide the second indication that highlights one or more nodes of the first pictorial graph in the mini-map that are responsible for providing the new service.

2. The computer system of claim 1, wherein the set of instructions cause the one or more processors to:

receive input to modify one or more settings that are common among the one or more second computing devices according to one or more values; and in response to receiving the input to modify the one or more settings according to the one or more values, update, on each computing device of the one or more second computing devices, the one or more settings according to the one or more values.

3. The computer system of claim 1, wherein the set of data defines a first edge of a first type that associates a first node with the second node in the graph;

wherein the first node corresponds to the first logical network object that represent the particular service;

wherein the second node corresponds to the second logical network object that represents the corresponding grouping of the one or more second computing devices based on a logical attribute of each of the one or more second computing devices;

wherein the first type indicates that the particular service is provided for the one or more second computing devices; and wherein the set of instructions cause the one or more processors to cause to present, on the display, the first edge with a first style.

4. The computer system of claim 3, wherein the set of data defines the second edge of a second type that associates the second node with a third node in the graph;

wherein the third node corresponds to a third logical network object that represents the corresponding grouping of the one or more second computing devices based on a physical attribute of each of the one or more second computing devices;

wherein the second type indicates corresponding grouping of the one or more second computing devices share the logical attribute and the physical attribute; and wherein the set of instructions cause the one or more processors to cause to present, on the display, the second edge with a second style that is different than the first edge.

5. The computer system of claim 1, wherein at least one of the one or more third computing devices is also among the one or more first computing devices.

6. The computer system of claim 1, wherein the set of instructions cause the one or more processors to cause to present, concurrently with the first pictorial graph, on the display, one or more nodes from the plurality of nodes in a second pictorial graph.

7. The computer system of claim 1, wherein second pictorial graph is smaller than the first pictorial graph.

8. The computer system of claim 1, wherein the set of instructions cause the one or more processors to:

receive input indicating that a user selected a first node, among the plurality of nodes, which corresponds to the first logical network object; and in response to receiving the input indicating that the user selected the first node, cause to present, on the display, one or more settings associated with the particular service.

9. The computer system of claim 8, wherein the set of instructions cause the one or more processors to:

receive input to modify one or more settings associated with the particular service according to one or more values; and in response to receiving the input to modify the one or more settings associated with the particular service according to the one or more values, update the one or more settings associated with the particular service according to the one or more values so that the particular service operates according to the one or more values.

10. The computer system of claim 8, wherein the set of instructions cause the one or more processors to:

receive input indicating that a user selected a second node, among the plurality of nodes, which corresponds to the second logical network object; and in response to receiving input indicating that the user selected the second node, cause to present, on the display, a list of the one or more second computing devices.

11. The computer system of claim 8, wherein the set of instructions cause the one or more processors to:

receive input indicating that a user selected a second node, among the plurality of nodes, which corresponds to the second logical network object; and in response to receiving the input indicating that the user selected the second node, cause to present, on the display, a list of one or more settings that are common among the one or more second computing devices.

12. The computer system of claim 8, wherein a particular setting of one or more settings is associated with a virtual computing device that supports the particular setting.

13. A method comprising:

retrieving, from the memory, a set of data that defines a plurality of logical network objects, wherein a first logical network object represents a particular internetworking service that is provided by one or more first computing devices among a plurality of computing devices in a computer network, and a second logical network object represents a corresponding grouping of one or more second computing devices of the plurality of computing devices in the computer network;

causing to present, on a display, a plurality of nodes in a first pictorial graph, wherein each node in the plurality of nodes corresponds respectively to each object in the plurality of logical network objects;

receiving input indicating that a new service should be provided by one or more third computing devices among the plurality of computing devices in the computer network for the one or more second computing devices;

causing to concurrently present, on the display, the first pictorial graph and a first indication that a first step of instantiating the new service is modifying one or more first settings that are common among the one or more second computing devices; and causing to concurrently present, on the display, the first pictorial graph and a second indication that a second step of instantiating the new service is modifying one or more second settings that are associated with the new service so that the new service operates according to the one or more second settings, wherein causing to concurrently present the first pictorial graph and the second indication further comprises:

causing to present, on the display, a new node in the graph that corresponds to a new logical network object of the plurality of logical network objects that represents the new service, causing to present, on the display, an edge between the new node and a second node indicating that the new service is for the one or more second computing devices, causing to present a mini-map illustrating a rendition of the first pictorial graph, the mini-map providing shortcuts to navigate the first pictorial graph, and causing to provide the second indication that highlights one or more nodes of the first pictorial graph in the mini-map that are responsible for providing the new service.

14. The method of claim 13, wherein the set of data defines a first edge of a first type that associates a first node with the second node in the graph;

wherein the first node corresponds to the first logical network object that represent the particular service;

wherein the second node corresponds to the second logical network object that represents the corresponding grouping of the one or more second computing devices based on a logical attribute of each of the one or more second computing devices;

wherein the first type indicates that the particular service is provided for the one or more second computing devices; and wherein the method comprises causing to present, on the display, the first edge with a first style.

15. The method of claim 13, wherein the set of data defines a second edge of a second type that associates the second node with a third node in the graph;

wherein the third node corresponds to a third logical network object that represents the corresponding grouping of the one or more second computing devices based on a physical attribute of each of the one or more second computing devices;

wherein the second type indicates corresponding grouping of the one or more second computing devices share the logical attribute and the physical attribute; and wherein the method comprises causing the one or more processors to cause to present, on the display, the second edge with a second style that is different than the first edge.

16. The method of claim 13 comprising causing to present, concurrently with the first pictorial graph, on the display, one or more nodes from the plurality of nodes in a second pictorial graph.

17. The method of claim 13 comprising:

receiving input indicating that a user selected a first node, among the plurality of nodes, which corresponds to the first logical network object; and in response to receiving the input indicating that the user selected the first node, causing to present, on the display, one or more settings associated with the particular service.

18. The method of claim 17 comprising:

receiving input to modify one or more settings associated with the particular service according to one or more values; and in response to receiving the input to modify the one or more settings associated with the particular service according to the one or more values, updating the one or more settings associated with the particular service according to the one or more values so that the particular service operates according to the one or more values.

* * * * *